United States Patent [19]

Crass et al.

[11] Patent Number: 4,673,611
[45] Date of Patent: Jun. 16, 1987

[54] SUPPORT FILM AND PRESSURE-SENSITIVE ADHESIVE TAPE

[75] Inventors: Guenther Crass, Taunusstein; Annegrete Bursch, Rüdesheim; Peter Hammerschmidt, Wiesbaden, all of Fed. Rep. of Germany

[73] Assignee: Hoechst Aktiengesellschaft, Frankfurt am Main, Fed. Rep. of Germany

[21] Appl. No.: 743,773

[22] Filed: Jun. 12, 1985

[30] Foreign Application Priority Data

Jun. 15, 1984 [DE] Fed. Rep. of Germany ....... 3422302

[51] Int. Cl.$^4$ .............................. B32B 7/02; C09J 7/02
[52] U.S. Cl. .................................... 428/215; 428/343; 428/345; 428/447; 428/451; 428/516; 428/910; 428/520
[58] Field of Search ............... 428/215, 516, 343, 910, 428/345, 447, 451

[56] References Cited

U.S. PATENT DOCUMENTS 3,853,595 12/1974 Pedginski et al. ................. 428/156
4,414,261 11/1983 Nanbu ............................. 428/343 X

FOREIGN PATENT DOCUMENTS 3144911 5/1983 Fed. Rep. of Germany .
3216603 11/1983 Fed. Rep. of Germany .

Primary Examiner—P. C. Ives
Attorney, Agent, or Firm—Schwartz, Jeffery, Schwaab, Mack, Blumenthal & Evans

[57] ABSTRACT

A pressure-sensitive adhesive tape is described, which comprises a support film formed of a co-extruded, biaxially oriented multilayer polypropylene film and an adhesive coating applied to one surface of the film. The support film is composed of at least first and second layers having different compositions. The second layer of the support film, which faces away from the adhesive coating, has a thickness of less than one third of the total thickness of the adhesive tape, and contains an antiadhesive substance.

16 Claims, 1 Drawing Figure

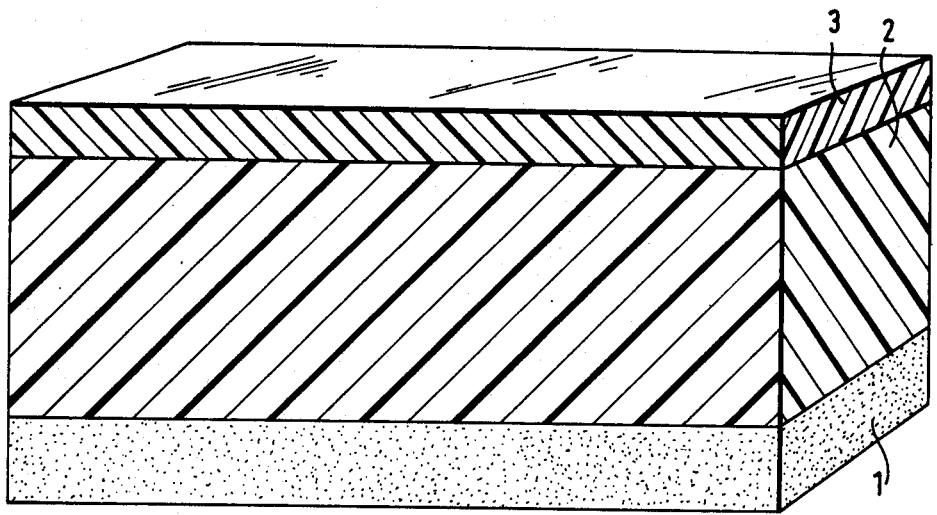

SUPPORT FILM AND PRESSURE-SENSITIVE ADHESIVE TAPE

BACKGROUND OF THE INVENTION

The present invention relates to a pressure-sensitive adhesive tape comprising a support film formed of a co-extruded, biaxially-oriented, multilayer polypropylene film and an adhesive coating applied to one surface of the film.

Adhesive tapes comprising polypropylene support films are known in the art and have been described in literature. German Offenlegungsschrift No. 3,144,911 discloses an adhesive tape having a monolayer support film of polypropylene admixed with particular resins, in order to improve its adhesion to the adhesive coating. Drawing adhesive tapes of this kind from a roll is sometimes rather difficult.

An adhesive tape having a multilayer support film formed of polypropylene is disclosed in German Offenlegungsschrift No. 3,216,603. This adhesive tape is alleged to have a particularly good capability for delamination. To this end, the tape has an internal layer, to which specific particles are added. In order to prevent delamination upon drawing this adhesive tape from a roll, an adhesive-repellent coating must additionally be provided on the surface of the support film which faces away from the adhesive coating.

SUMMARY OF THE INVENTION

It is an object of the present invention to provide an adhesive tape which can easily be drawn from a roll, without requiring an additional coating on the reverse side.

The object of the invention is achieved by providing an adhesive tape comprising a co-extruded, biaxially-oriented, multilayer polypropylene support film and an adhesive layer, wherein the support film comprises at least two layers having different compositions, and the second layer of the support film, which faces away from the adhesive coating, has a thickness of less than one third of the total thickness of the adhesive tape, and contains an anti-adhesive substance.

Further objects, features and advantages of the present invention will become apparent from the detailed description of preferred embodiments which follows, when considered together with the attached FIGURE of drawing.

BRIEF DESCRIPTION OF THE DRAWING

The FIGURE shows a cross-sectional view of an adhesive tape according to the present invention.

DETAILED DESCRIPTION OF THE PREFERRED EMBODIMENTS

The support film particularly comprises two layers. Of these, the first layer, to which the adhesive coating is applied, has a greater thickness than the second layer, which is opposite the adhesive coating. The support film is produced by co-extrusion. The layer having the greater thickness comprises a homopolymer of propylene, or copolymer of propylene containing an ethylene proportion of up to 10% by weight.

To improve the strength, modulus of elasticity or toughness of the support film, the first layer of the support film, to which the adhesive coating is applied, can additionally be modified by adding natural or synthetic resins. Illustrative resins which are suitable include, for example, a non-hydrogenated styrene polymer, a methyl styrene copolymer, pentadiene polymers, α-pinene or β-pinene polymers, colophony or colophony derivatives or, preferably, terpene polymers and hydrogenated or partially hydrogenated compounds thereof or an α-methyl styrene-vinyl toluene copolymer. If desired it is also possible to use mixtures of these resins. The resins are added in a quantity of up to 25% by weight, preferably from 15 to 25% by weight, based on the weight of the polymer forming the first layer of the support film, to which the adhesive coating is applied. The resins additionally produce an improved adhesion between the adhesive coating and the support film. To improve adhesion even further, the surface of the first layer of the support film to which the adhesive coating is to be applied may additionally be subjected to a corona discharge treatment, which is preferably carried out during the manufacture of the support film.

The second layer of the support film, which faces away from the adhesive coating, is also composed of homopolymers of propylene, or copolymers of propylene containing an ethylene proportion of up to 10% by weight; however, this layer is preferably not admixed with resins. In any case, an anti-adhesive substance is added to the layer in an amount from about 0.2% to about 3% by weight, preferably from about 0.3% to about 2% by weight, based on the weight of the polymer forming the layer. The anti-adhesive substance advantageously comprises a polydiorganosiloxane, particularly a dimethylpolysiloxane having a kinematic viscosity of at least 100 mm$^2$/s at a temperature of 25° C.

The total thickness of the support film is in the range from between about 15 to about 50 μm, preferably from about 20 to about 40 μm. The layer of the support film, which faces away from the adhesive coating, has a thickness in the range between about 0.5 to about 10 μm, preferably between about 1.0 to about 5.0 μm.

As the adhesive coating, the customary adhesives can be used, such as rubber or acrylate adhesives which are described in detail in literature.

The arrangement of the parts of the adhesive tape of the invention is illustrated in the accompanying drawing FIGURE. In the FIGURE, reference numeral 1 indicates the adhesive coating, 2 is the first layer of the support film, which carries the adhesive coating, and 3 is the second layer which faces away from the adhesive coating and is admixed with the anti-adhesive substance.

EXAMPLE 1

A two-layer support film comprising propylene homopolymers, which had a total thickness of 30 μm and was composed of a first, 27 μm thick and a second, 3 μm thick layer which additionally contained 1.5 percent by weight of dimethylpolysiloxane, was coated with a rubber adhesive on the thicker layer thereof. The film was cut into 25 mm wide strips and wound up into a roll. By means of a spring balance, the effort or force required to draw the adhesive tape from the roll was then measured. The effort was 4.2 Newtons.

EXAMPLE 2

(Comparative Example)

A monolayer support film of polypropylene was coated with the same adhesive as used in Example 1, cut into strips having a width of 25 mm and wound up into a roll. A force of 10.0 Newtons was required to draw this adhesive tape from the roll.

What is claimed is:

1. Pressure-sensitive adhesive tape, comprising:
   a support film including a co-extruded, biaxially-oriented, multilayer, polypropylene film having at least first and second layers of different composition, wherein the second layer incorporates a polydiorganosiloxane anti-adhesive substance, and wherein the second layer has a thickness less than one third of the thickness of the adhesive tape; and
   an adhesive coating applied to the first layer, wherein the second layer faces away from the adhesive coating and defines an outer surface.

2. An adhesive tape according to claim 1, wherein said first layer comprises a polypropylene material selected from the group consisting of homopolymers of polypropylene and copolymers of propylene containing up to about 10% by weight of ethylene.

3. An adhesive tape according to claim 2, wherein a modifying resin selected from the group consisting of natural and synthetic resins is incorporated into the polypropylene material of said first layer.

4. An adhesive tape according to claim 3, wherein said modifying resin is selected from the group consisting of non-hydrogenated styrene polymers, methyl styrene copolymers, pentadiene polymers, α-pinene or β-pinene polymers, colophony or colophony derivatives, terpene polymers, hydrogenated or partially hydrogenated compounds thereof, α-methyl sytrene-vinyl toluene copolymers, and mixtures of two or more of the foregoing.

5. An adhesive tape according to claim 3, wherein up to 25% by weight of said modifying resin is incorporated into said propylene material of said first layer.

6. An adhesive tape according to claim 5, wherein said first layer comprises from about 15% to about 25% of said modifying resin by weight.

7. An adhesive tape according to claim 1, wherein said first layer is subjected to a corona discharge treatment for improving adhesion to the adhesive coating.

8. An adhesive tape according to claim 1, wherein said second layer comprises a polypropylene material selected from the group consisting of homopolymers of polypropylene and copolymers of propylene containing up to about 10% by weight of ethylene.

9. An adhesive tape according to claim 1, wherein said anti-adhesive substance comprises from about 0.2% to about 3.0% polydiorganosiloxane by weight compared to the weight of polymer in said second layer.

10. An adhesive tape according to claim 1, wherein said anti-adhesive substance comprises from about 0.3% to about 2.0% polydiorganosiloxane by weight compared to the weight of polymer in said second layer.

11. An adhesive tape according to claim 1, wherein said anti-adhesive substance comprises a dimethylpolysiloxane having a kinematic viscosity of at least about 100 mm$^2$/s at 25° C.

12. An adhesive tape according to claim 1, wherein said support film has a thickness in the range between about 15 μm and about 50 μm.

13. An adhesive tape according to claim 1, wherein said support film has a thickness in the range between about 20 μm and about 40 μm.

14. An adhesive tape according to claim 1, wherein said second layer has a thickness between about 0.5 μm and 10.0 μm.

15. An adhesive tape according to claim 1, wherein said second layer has a thickness between about 1.0 μm and 5.0 μm.

16. A support film for adhesive tape, comprising:
   a coextruded, biaxially-oriented, multilayer, polypropylene film having at least first and second layers of different composition, wherein the second layer incorporates a polydiorganosiloxane anti-adhesive substance and defines a first surface of the support film opposite a second surface on which an adhesive is to be applied, and wherein the second layer has a thickness less than one third of the thickness of the adhesive tape.

* * * * *